May 21, 1940.   L. E. WOOD   2,201,568
COMPOSITE ARTICLE AND ITS METHOD OF MANUFACTURE
Filed Oct. 10, 1936
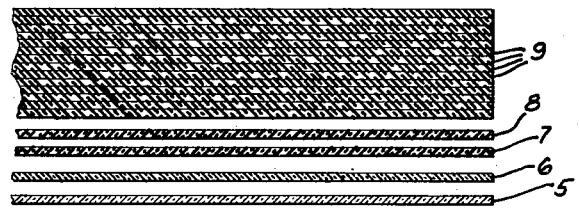
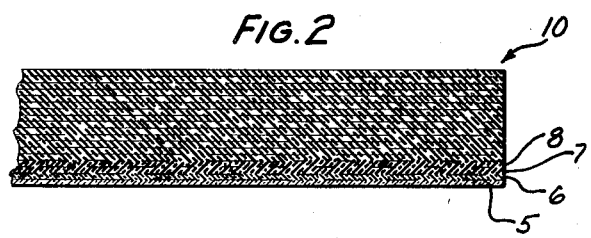
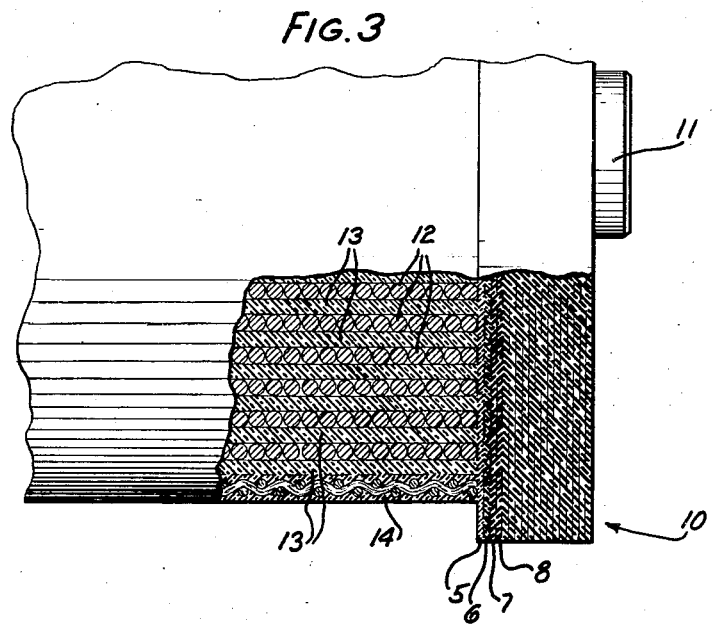
INVENTOR
L. E. WOOD
BY H. A. Whitehorn
ATTORNEY Patented May 21, 1940

2,201,568

UNITED STATES PATENT OFFICE 2,201,568

COMPOSITE ARTICLE AND ITS METHOD OF MANUFACTURE

Lloyd E. Wood, Chicago, Ill., assignor to Western Electric Company, Incorporated, New York, N. Y., a corporation of New York Application October 10, 1936, Serial No. 104,974

4 Claims. (Cl. 154—2)

This invention relates to composite articles and their method of manufacture, and more particularly to composite sheets of insulating materials and methods of producing them.

Phenol fiber material is ideal for making spool heads for coils, but in cases where it is desired to make a completely sealed coil, such as a coil sealed in cellulose acetate, it is impractical to cause the cellulose acetate to directly adhere to the phenol fiber heads.

An object of the present invention is to provide a cellulose acetate faced phenol fiber insulating material suitable for coil heads and a simple and economical method of making such material.

In accordance with one embodiment of the invention, a binder sheet is impregnated with a mixture of cellulose acetate and synthetic resin, such as a phenolic condensation product, and to one side of this a cellulose acetate sheet is adhered while to the other side thereof one or more buffer sheets impregnated with phenol varnish is adhered. The buffer sheets then have a plurality of sheets of phenol fiber containing a plasticizer adhered thereto.

Other features and advantages of the invention will become apparent from the following description taken in conjunction with the accompanying drawing, in which Fig. 1 is a fragmentary disassembled sectional view through the sheets, Fig. 2 is a fragmentary sectional view of the sheets shown in Fig. 1 after they have been heated and pressed to form the composite sheet, and Fig. 3 is a fragmentary elevational view, partly in section, of an electrical coil with a head formed of composite material secured in place thereon.

Referring now more in particular to the drawing, a sheet 5 of cellulose acetate or a fibrous material impregnated with cellulose acetate comprises one of the outer surfaces of the composite sheet. Adjacent the sheet 5 is a sheet 6 comprising a binder sheet which is impregnated with a mixture of cellulose acetate and a synthetic resin such as a phenolic condensation product. Sheets 7 and 8 comprise buffer sheets of a fibrous material impregnated with a synthetic resin which do not contain a plasticizer. Adjacent the buffer sheet 8 there are a plurality of sheets 9 comprising fibrous material impregnated with a synthetic resin and a suitable plasticizer. While the buffer sheets 7 and 8 may be firmly adhered to the binder sheet 6, the sheets 9 containing the plasticizer cannot be effectively adhered to the binder sheet. However, by interposing one or more buffer sheets 7 and 8, the buffer sheets which are free from plasticizer adhere firmly to the binder sheet 6 and the sheets 9 containing the plasticizer adhere firmly to the buffer sheet 8.

The sheets of fibrous material impregnated with phenol resin may, as pointed out hereinbefore, be produced in any well known manner for forming phenol fiber. When no plasticizer is used in these sheets, they are too brittle for many purposes. The sheet of cellulose material may be composed of cellulose acetate and may be, for example, .001" in thickness, or may be a sheet of fibrous material impregnated with cellulose acetate and of any desired thickness.

The binder sheet 6 comprises a sheet of paper which has been impregnated in a solution of cellulose acetate and phenol resin so that the impregnated sheet will contain approximately 50 percent of cellulose acetate and phenol resin, and 50 percent paper. A solution suitable for impregnating the binder sheet may be comprised of eight ounces of plasticized cellulose acetate in solution in one gallon of acetone to which may be added sixteen ounces of phenol varnish. After the solution is made in the manner just described, it may be diluted with acetone sufficiently so that upon impregnating paper with the diluted solution an impregnated paper containing approximately 30 percent of the mixture of cellulose acetate and phenol resin, and 70 percent paper will be produced. The plasticizer used may be of any suitable type such that it will render the cellulose acetate sufficiently plastic at the temperature used in molding it so that the cellulose acetate in the binder sheet 6 will adhere to the cellulose acetate in the sheet 5.

For some unaccountable reason, the phenol varnish impregnated sheets 9 containing a plasticizer will not adhere to the binder sheet 6 as effectively and uniformly as is desired for many purposes, but they firmly adhere to the sheets 7 and 8, which contain no plasticizer, and the sheets 7 and 8 in turn will effectively adhere to the binder sheet 6.

After these sheets are assembled in the relative positions shown in Fig. 1, the whole pile-up of sheets 5, 6, 7, 8, and 9 is then pressed between metal plates at such a temperature and pressure, and for such a time, as to cure the phenol fiber and cause the cellulose acetate sheet to adhere firmly to the assembly. A typical example of the heat and pressure required is a pressure of 1200 pounds per square inch, at a temperature of 360° F. for forty minutes.

An alternative method of preparing the binder sheet 6 for assembling with the sheets 7, 8 and 9 of phenol impregnated fibrous material, and the sheet 5 of cellulose material, is to make a solution of cellulose acetate and a plasticizer in acetone mixed with an alcohol solution containing approximately 50 percent of phenol resin. The quantities of cellulose acetate and phenol resin in the resultant product therefore will be approximately equal. The absorbent paper is then impregnated with the above solution so that it contains approximately 45 percent of resin and cellulose acetate, and 55 percent paper and solvent and is then dried in an oven at a temperature sufficient to remove most of the solvents, but not high enough to cure completely the phenol resin, whereupon the binder sheet 6 may be assembled with the phenol resin impregnated sheets 7, 8, and 9 and the cellulose acetate sheet 5 and subjected to heat and pressure to form the desired composite sheet 10.

Wherever the term "paper" has been used hereinbefore, it will be understood that fabric could be used in place of the paper if it were desired to have a fabric impregnated sheet. However, in the embodiment of the invention selected for illustration, the composite material being formed is adapted for use as the heads of electrical coils and fibrous material such as paper has proven more desirable for this use and accordingly a composite sheet in which impregnated paper is used throughout has been described.

The material described hereinbefore is particularly useful when it is to serve as the head of an electrical coil such as that shown in Fig. 3 which comprises a core 11 upon which are wound alternate layers of wire 12 and insulating material 13. It is preferred that the insulating material 13 be paper impregnated with cellulose acetate, and that the edges of the insulating material extend slightly beyond the servings of wire 12, and it is also preferred that the outer serving of insulating material 13 have superposed thereon a layer 14 of fabric impregnated and coated with cellulose acetate and having its ends extending slightly beyond the servings of wire 12.

When a coil is formed in accordance with the method just described, the composite head 10 may be secured thereto by simply dipping the end of the formed coil in acetone or any other solvent for cellulose acetate to dissolve partially the cellulose acetate in the insulating material 13 and in the fabric outer casing 14, whereupon the head may be pressed into engagement with the edges of the insulating paper and the fabric to which it will be firmly attached by coalescence of the cellulose acetate in the sheet 5 and in the fabric 14 and insulating material 13. A coil formed in accordance with the just described method will have each layer of wire 12 sealed in an air tight envelope comprising the adjacent layers of insulating material 13 and the heads 10.

It has been determined that a coil head formed in accordance with the method described hereinbefore may be fixed to a coil in the manner described without the necessity of providing any other means for holding it in place.

Although specific examples of the quantities of the various ingredients used in making the composite sheet have been given hereinbefore, it is to be understood that the invention is to be limited only by the scope of the appended claims, wherein the term "cellulose material" is not to be limited to cellulose acetate, but is to include any cellulose esters and sheets of fibrous material impregnated with cellulose acetate or other cellulose esters.

What is claimed is:

1. A composite article comprising a fibrous sheet impregnated with a mixture of cellulose acetate and a phenol resin, a sheet of cellulose acetate coalesced to one face thereof, a fibrous sheet impregnated with an unplasticized phenol resin coalesced to the opposite face thereof, and a sheet of fibrous material impregnated with phenol resin and a substantial amount of plasticizer coalesced to the sheet impregnated with the unplasticized phenol resin.

2. A composite article comprising a fibrous sheet impregnated with a mixture of a phenol resin and a cellulose derivative, a sheet of a cellulose derivative coalesced to one face thereof, a fibrous sheet impregnated with an unplasticized phenol resin coalesced to the other face thereof, and a sheet of fibrous material impregnated with a phenol resin to which a substantial amount of plasticizer has been added coalesced to said fibrous sheet impregnated with the unplasticized phenol resin.

3. A method of making a composite article comprising assembling a fibrous sheet impregnated with phenol resin and a substantial amount of plasticizer, a fibrous sheet impregnated with unplasticized phenol resin, a fibrous sheet impregnated with a mixture of a cellulose derivative and a phenol resin, and a fibrous sheet impregnated with a cellulose derivative, in the order named, and consolidating the assembly under heat and pressure.

4. A method of making a composite article comprising assembling a fibrous sheet impregnated with phenol resin to which a substantial amount of plasticizer has been added, a fibrous sheet impregnated with unplasticized phenol resin, a fibrous sheet impregnated with a mixture of cellulose acetate and phenol resin, and a sheet of cellulose acetate, in the order named, and consolidating the assembly under heat and pressure.

LLOYD E. WOOD.